United States Patent [19]

Metzgar et al.

[11] 3,816,777

[45] June 11, 1974

[54] ELECTRODYNAMIC FORCE GENERATOR

[76] Inventors: Kenneth Joseph Metzgar, 1256 Longview Dr., Fullerton, Calif. 92631; Frank Macomb Tillou, 1025 Hilda St., Anaheim, Calif. 92806

[22] Filed: Dec. 27, 1972

[21] Appl. No.: 319,020

[52] U.S. Cl. .................... 310/13, 73/71.6, 310/27
[51] Int. Cl. ............................................ H02k 33/18
[58] Field of Search ........................... 310/12–15, 310/27; 73/71–72.7; 179/15.5–120

[56] References Cited
UNITED STATES PATENTS

| | | | |
|---|---|---|---|
| 3,161,793 | 12/1964 | Laithwaite | 310/27 |
| 3,440,464 | 4/1969 | Tolmie | 310/27 X |
| 3,505,544 | 4/1970 | Helms | 310/13 |
| 3,666,977 | 5/1972 | Helms | 310/27 X |
| 3,735,162 | 5/1973 | Alth | 310/13 |

*Primary Examiner*—D. F. Duggan
*Attorney, Agent, or Firm*—Raymond L. Madsen

[57] ABSTRACT

There is disclosed an assembly of magnetic circuit structures each having a pair of pole pieces and a magnet, the pair of pole pieces being spaced apart and separated by an elongated opening of uniform width into which the magnet is inserted, and attached to one of the pair of pole pieces, the width of the magnet being less than the width of the elongated opening to form a uniform air gap between the magnet and the other of the pair of pole pieces. A substantially uniform magnetic field is generated across the air gap and in which a multiplicity of electrically conductive turns of a movable coil are located, the coil being adapted to connect to a source of electrical current. The movable coil has a central opening therethrough adapted to receive the other of the pair of pole pieces whereby the movable coil is propelled along the air gap in response to a force generated by the uniform magnetic field upon the electrically conductive turns when an electrical current is conducted through the movable coil therethrough.

6 Claims, 8 Drawing Figures

ELECTRODYNAMIC FORCE GENERATOR

THE DISCLOSURE

The present invention relates to electrodynamic force generators and more particularly to electromagnetic linear motion transducers and electrodynamic shakers.

In the field of experimental measurement of the dynamic behavior of complex structures, it has been the general practice to employ shakers which are adjustable in both frequency and level of excitation. Three general types of shakers have been used predominantly. These are the rotating eccentric mass, the electrohydraulic and the electrodynamic shaker. Of these, the electrodynamic shaker has found the most wide usage, because of its versatility and operating characteristics particularly well suited to modal testing requirements.

An experimental approach to determining the natural modes of complex structures is disclosed in "A System For The Excitation of Pure Natural Modes of Complex Structures" by R. C. Lewin and D. L. Wrisley, Journal of the Aeronautical Sciences, Vol. 17, No. 11, Nov. 1950, pp. 705–723. The method utilizes a distribution of small electrodynamic shakers deployed along the structure and adjusted in sinusoidal force level, frequency, and sense to produce predominant response in a desired mode with the exclusion of response in all other modes. Once a close approximation to the true natural mode shape has been produced, measurements of motion, internal stress, and damping can be made.

Recently, increased emphasis has been placed on measurement of the dynamic response characteristics of other types of large structures which are subject to seismic excitation. If a vibratory force is applied to a structure, the resulting motion at any point may be considered to be the summation of the motions of that point, considered separately for each mode. The response of that point in each mode is determined by considering it to be the response of a single degree of freedom system, the amplitude and phase of which is determined by the proximity of the driving frequency to the natural mode frequency. Thus the resultant composite response of the point will in general be different in amplitude and phase from any other point, but of the same frequency. Even if the excitation frequency coincides with one of the natural mode frequencies of the structure, response will be obtained from adjacent modes, and the resulting motion will in general not be that of a pure mode. For all but the most elementary structures, therefore, it is necessary to use a number of shakers distributed over the structure to obtain a forcing function that is orthogonal to the unwanted modes. When the correct distribution of applied force is obtained, the motions of all points of the structure simultaneously will reach their maxima and will be either in or out of phase with one another. As the frequency is then varied, while holding the correct force distribution, the magnitude of the response of all points will reach a maximum at the true natural mode frequency. Thus, inherent to the approach of establishing a pure natural mode of a structure is the need to have a number of individual shakers distributed over the structure.

The number of shakers to be used on a given structure depends not only on the total force required, but also on the number of modes lying within the frequency band of concern, their complexity, degree of coupling, and frequency separation. As a general rule, if some of the natural modes are highly coupled or closely spaced in frequency, the minimum number of shakers should not be less than the number of anti-nodes of the highest order of mode to be excited. Excitation of antisymmetric or torsional modes may require twice that number, acting in pushpull pairs on opposite sides of the center of rotation. Multiples of four shakers are typically employed in modal testing.

It is desired to apply a force to a given test structure with minimum mass loading and constraint of the drive point motion by the shaker. It is desired also that the shaker produce a low distortion, sinusoidal wave form of force, the magnitude of which is continuously adjustable and independent of operating frequency and drive point response motion. Because of the requirement to locate shakers at various points on a large structure, it is desirable that each shaker be readily portable and be capable of acting with its force axis inclined at any angle between vertical and horizontal, with no degradation of performance. Reaction force equal and opposite to that applied to the structure must be accommodated. Thus, either of two modes of operation should be possible when the shaker is used above ground level. These are termed "fixed body" and "resiliently suspended" modes. In the fixed body mode, a support structure is erected to position and support the shaker and provide a rigid attachment between the shaker body and ground to accommodate the reaction force. In the resiliently suspended mode, the shaker body alone provides a reaction mass, and its motion, as well as that of the test structure, must be accommodated by the resilient suspension system. Also, the center of mass of the shaker should lie on the line of action of the force, in order that no undesirable reaction torques be developed when the unit is suspended. The shaker design should accommodate both modes of operation.

Although prior art shakers have served the purpose, they have not proved entirely satisfactory under all conditions of service for the reasons that considerable difficulty has been experienced in obtaining the feature of portability and the versatility of obtaining a force axis inclined at any angle between vertical and horizontal. Furthermore, considerable difficulty has been experienced in obtaining a shaker where the center of mass lies on the line of action of the force to prevent undesirable reaction torques when the unit is suspended. In addition, it has been difficult to obtain electrodynamic shakers having a uniform force over its range of motion and modes of operation. The present invention overcomes these difficulties.

Those concerned with the development of electrodynamic shakers have long recognized the need for a long stroke, light weight shaker designed and rated specifically for driving structures at their natural resonant frequencies. The present invention fulfills this need.

Another problem confronting designers of electrodynamic shakers and linear motion transducers is the inductance presented to the armature coil by the magnetic circuit. In the past it has been necessary to utilize compensating windings such as shorted turns in the magnetic circuit structure along with the inherent power losses and undesirable heating. The present invention overcomes this problem.

The general purpose of this invention is to provide an electrodynamic force generator and linear motion transducer which embraces all the advantages of similarly employed electrodynamic shakers and possesses none of the aforedescribed disadvantages. To obtain this, the present invention contemplates a unique assembly of magnetic circuit structure around a movable armature coil whereby the coil remains in a uniform magnetic field over the entire range of motion and a minimum inductance is presented to the armature coil and whereby a light and portable unit is obtained to meet the requirements of a modal shaker.

An object of the present invention is the provision of an electrodynamic shaker with a minimum mass loading and constraint of the drive point motion.

Another object is to provide an electrodynamic shaker with a low distortion, sinusoidal wave form of force, the magnitude of which is continuously adjustable and independent of operating frequencies and drive point response motion.

A further object of the invention is the provision of an electrodynamic shaker which is readily portable and capable of acting with its force axis inclined at any angle between vertical and horizontal, with no degradation of performance.

Still another object is to provide a magnetic circuit configuration such that the armature coil remains in a uniform magnetic field over the entire stroke range to provide force linearity.

Yet another object of the present invention is the provision of a magnetic structure for an electrodynamic force generator which provides a minimum of inductive reactance in the movable armature coil.

Yet another object of the present invention is the provision of an assembly of magnetic circuit structures for electrodynamic shakers which permits the magnetizing of a permanent magnet within each structure without further disassembling the magnetic circuit to insert the movable armature coil.

A still further object is to provide a center of mass of the electrodynamic shaker which lies on the line of action of force in order that no undesirable reaction torques be developed.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1:
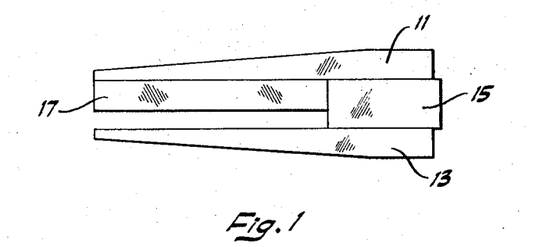
FIG. 1 illustrates a side view of a preferred embodiment of the basic magnetic circuit structure of the present invention.

Referring now to the drawings, wherein like reference characters designate like or corresponding parts throughout the several views, there is shown in FIG. 1 a side view of a basic magnetic circuit structure or subassembly having a first pole piece 11 and a second pole piece 13 separated by a magnetic connector or separator block 15 to provide an elongated opening wherein magnet 17 is inserted and attached to pole piece 11. The pole pieces and separator block are made of magnetic material to provide a low reluctance magnetic flux path for the magnetic field generated by magnet 17. Magnet 17 may be an electromagnet or permanent magnet. A preferred embodiment of the invention contemplates a rectangular ceramic permanent magnet which is magnetized after being assembled into the magnetic circuit structure of FIG. 1. Pole pieces 11 and 13 are tapered in thickness to reduce the weight of the structure, to establish a nearly constant magnetic flux density in the pole near saturation and minimize the amount of magnetic material of the pole pieces. An air gap is formed between magnet 17 and pole piece 13 in which a uniform magnetic field is produced by magnet 17. Magnetic separator block 15 extends beyond the ends of pole pieces 11 and 13 for alignment purposes when the structure is assembled with an armature coil.

Figure 2:
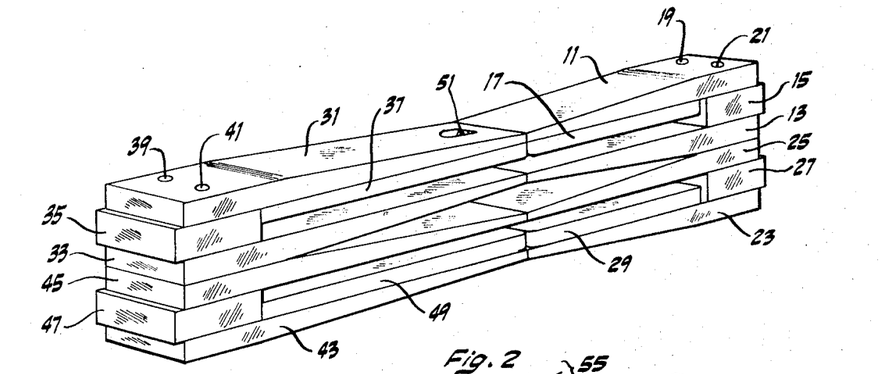
FIG. 2 shows a pictorial view of a complete assembly of magnetic circuit structures.

Turning now to FIG. 2 there is illustrated a preferred embodiment of the complete assembly of four magnetic circuit structures of the type illustrated in FIG. 1. A first magnetic circuit structure comprising pole pieces 11 and 13, magnetic separator block 15 and magnet 17 is connected to a second magnetic circuit structure substantially similar to the first structure and consisting of pole pieces 25 and 23, magnet separator blocks 27 and magnet 29. Bolts 19 and 21 connect the first and second magnetic circuit structures together such that pole piece 13 of the first structure is adjacent pole piece 25 of the second structure. Third and fourth magnetic structures substantially similar to the first and second structures are assembled in a configuration substantially similar to the assembly of the first and second structures. The third structure comprises pole piece 31, magnetic separator block 35 and magnet 37 attached to pole piece 31. The fourth structure includes pole pieces 43 and 45, magnetic separator block 47 and magnet 49 connected to pole piece 43. The third and fourth structures are connected together by bolts 39 and 41. The open ends of the pole pieces of the assembly of the first and second structures are juxtaposed and mate with the open ends of the pole pieces of the assembly of the third and fourth structures and the ends of the outer-most pole pieces being fastened together by bolt 51 inserted into a recessed opening in pole piece 31 and threaded into a tapped hole drilled in the end of pole piece 11. It should be noted that other methods of fastening may be employed to keep the assemblies attached. Two long air gaps are formed by the assembly of magnetic circuit structures, the first being located between magnet 17 and pole piece 13 and magnet 37 and pole piece 33 and the second between magnet 29 and pole piece 25 and magnet 49 and pole piece 45.

Figure 3:
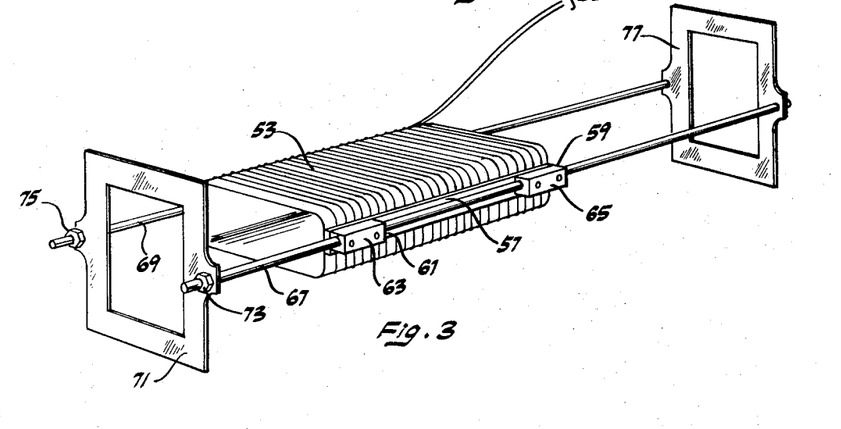
FIG. 3 shows a pictorial view of a preferred embodiment of the movable armature coil assembly of the present invention.

FIG. 3 illustrates the armature or movable coil assembly showing movable coil 53 having electrical input leads 55 connected thereto and having support bar 57 attached to the sides thereof which in turn is attached to bearings 59 and 61. Bearings 59 and 61 further have attached surfaces 63 and 65 with threaded holes therein for connecting a thrust frame or bridge structure or a shaker table (which are not illustrated). Bearings 59 and 61 further ride on rod 67. Similar bearings (not visible) on the other side of coil 53 are attached to rod 69. Rods 67 and 69 are further connected to endplate 71 by nuts 73 and 75, respectively, which nuts are threaded on the ends of the rods. The other ends of rods 67 and 69 are similarly connected to endplate 77. Armature coil 53 moves freely on the bearings along rods 67 and 69. It is also contemplated within the present invention to use endplates which are fastened directly to each of the magnetic structure assemblies by bolts passing through the endplates and engaging threaded holes in the ends of the outer-most pole pieces. In this arrangement, the endplates may be of a thickness to permit the ends of the armature support rods to fit into precisely located recessed holes in the endplates rather than pass therethrough and fasten with nuts. The important feature of the fastening arrangement for the endplates contemplated within the present invention is the alignment provided to the armature coil support rods.

Figure 4:
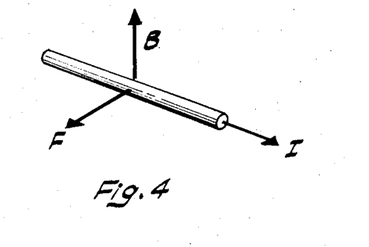
FIG. 4 illustrates the direction of force on a current conducting wire in a magnetic field.

In FIG. 4 there is illustrated the directional relationship of a force produced on a current conducting wire in an orthogonal magnetic field in which the wire is inserted. Magnetic field B is perpendicular to a wire in a direction perpendicular to both the direction of magnetic field B and the direction of current I. Stated in another way, a conductor carrying a current which is perpendicular to a magnetic field incident thereon produces a force in a direction which is perpendicular to both the direction of current and the magnetic field.

Figure 5:
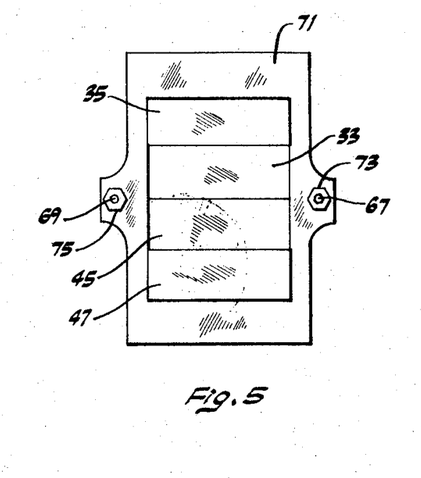
FIG. 5 shows an end view of a complete assembly of magnetic circuit structures with the movable armature coil.

Turning now to FIG. 5 there is shown an end view of the armature coil of FIG. 3 and the magnetic circuit assembly of FIG. 2 assembled together in a preferred embodiment of the present invention. Magnetic separator block 35 protrudes through the opening in endplate 71 along with magnetic block 47, the opening in the endplate being formed to fit snugly around magnetic separator blocks 35 and 47. Pole pieces 33 and 45 are shown sandwiched between magnetic separator blocks 35 and 47. Rods 67 and 73 are attached to endplate 71 by nuts 69 and 75, respectively, and are accurately positioned relative to the assembly of the four magnetic structures to precisely locate the armature or moving coil in the air gaps of the assembly as described in connection with FIG. 2.

Figure 6:
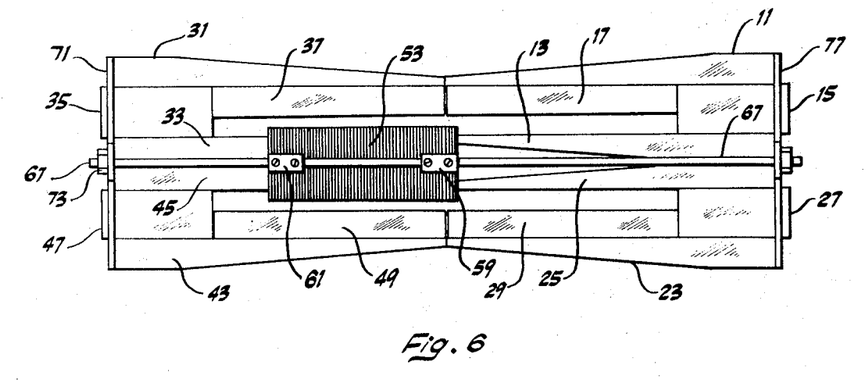
FIG. 6 illustrates a side view of the assembly of magnetic circuit structures and with the armature coil.

FIG. 6 illustrates a side view of the entire assembly of the four magnetic circuit structures of FIG. 2 and the armature or movable coil assembly of FIG. 3. Endplates 71 and 77 are shown with magnetic blocks 15 and 35 and 27 and 47 protruding therethrough, respectively, for positioning and aligning the endplates on the magnetic circuit structure assembly. Rod 67 and rod 69 (not visible) are positioned by the endplates such that bearings 61 and 59 and the bearings on rod 69 (not visible) attached to coil 53 accurately position coil 53 in the air gap between magnet 17 and pole piece 13, magnet 29 and pole piece 25, magnet 49 and pole piece 45 and magnet 37 and pole piece 33. A V slot between juxtaposed tapered pole pieces 13 and 25 is clearly visible and they could be replaced by a single pole piece with such a V shaped slot.

Figure 7:
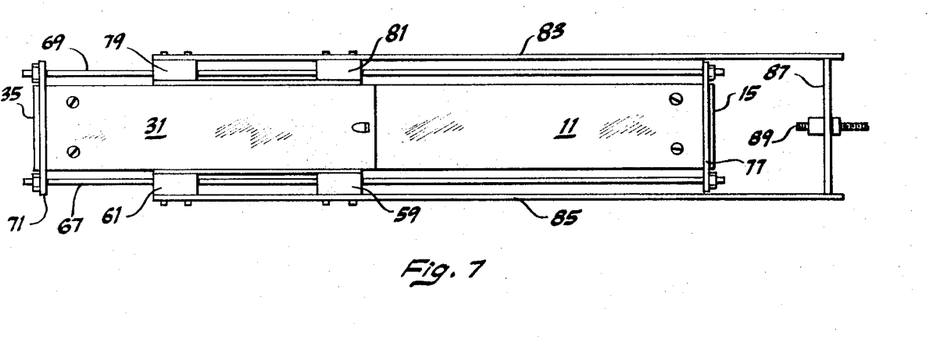
FIG. 7 shows a top view of the assembly of magnetic circuit structure with armature coil and armature coil thrust link and frame assembly.

FIG. 7 illustrates a top view of the armature or movable coil and magnetic circuit structure assembly as illustrated in FIG. 6 further including a thrust link and a thrust frame or bridge attached to the bearings on the movable coil. Frame member 83 of the thrust frame is connected to bearing 81 and 79 which ride on rod 69 and are attached to coil 53 (not visible). Similarly frame member 85 is attached to bearings 59 and 61 which in turn ride on rod 67 and are attached to coil 53 (not visible). Frame members 83 and 85 are further connected together at the ends thereof and outside the magnetic structure assembly by cross member or yoke 87. Centrally located on cross member arm 87 is thrust rod 89. Thrust rod 89 may be further attached to a table or the structure under test (not visible). It should be noted that the frame members of the thrust bridge may be connected directly to the armature coil and the bearings or bearing blocks in turn connected to the frame members. When mounted in this manner, it is necessary to provide openings in the endplates through which the frame members may pass and freely move.

Figure 8:
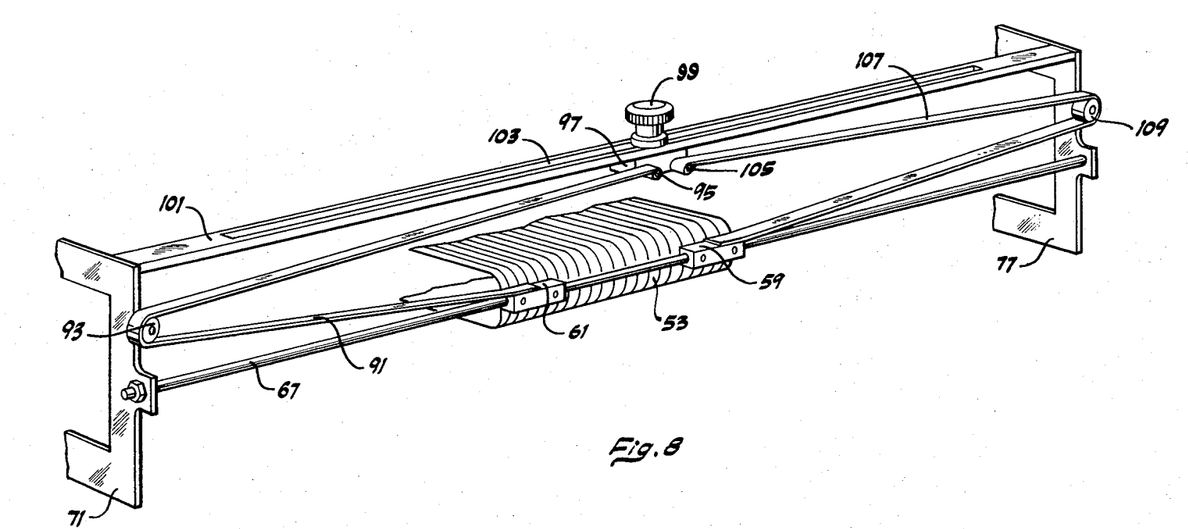
FIG. 8 illustrates an elastic suspension system for the armature coil.

FIG. 8 shows a pictorial view of part of an elastic suspension system for holding movable aramture 53 in a given reference position when the force axis of the complete electrodynamic shaker system assembly is mounted at an angle with respect to a horizontal reference plane. Elastic band 91, which may be made of rubber, is fastened to bearing block 61 and stretched around wheel 93 (attached to end plate 71) and then connected to pin 95 which in turn is attached to sliding block 97. Block 97 is adjustable along bar 101 by loosening knob 99 and sliding along slot 103. Bar 101 is attached to the end plates. Similarly elastic band 107 is attached to pin 105 on block 97 and is stretched around wheel 109 (attached to end plate 77) and attached to bearing block 59. Another identical system of elastic bands is associated with the other set of bearings (not visible) on the other side of the armature coil and magnetic circuit structure assembly.

Operation of the present invention can best be described by first referring to the magnetic circuit structure illustrated in FIG. 1. This magnetic circuit structure is a complete magnetic circuit in that the magnetic flux generated by magnet 17 exits from the magnet surface uniformly through the air gap into pole piece 13. The tapered thickness dimension of pole piece 13 establishes a substantially uniform flux density through pole piece 13 as the magnetic flux enters from the air gap and traverses the length of the pole piece and into magnetic spacing or separator block 15. The magnetic flux further continues into pole piece 11 where again the flux density is maintained substantially constant therethrough by the tapered thickness dimension. The magnetic flux then enters magnet 17 from pole piece 11 to complete the magnetic circuit. By constructing a magnetic circuit structure in the form described above, it is possible to utilize a permanent magnet for magnet 17 and to magnetize the magnet assembled within the magnetic circuit structure without the need to disassemble the structure when it is assembled together with the other magnetic circuit structures illustrated in FIG. 2 including movable armature coil 53 illustrated in FIG. 3. Therefore, no loss of magnetic flux in the magnet will occur as is the case in many prior art magnetic circuit structures which must be assembled around the armature coil.

As illustrated in FIG. 2, the four magnetic circuit structures are readily assembled to form a complete magnetic structure assembly without the need to disassemble any one of the four preassembled and magnetized structures. This is further readily observable on turning to FIG. 6 and noting that each half of the magnetic structure assembly can be assembled and then the two halves further assembled by placing pole pieces 13 and 25 of one half the assembly along with pole pieces 33 and 45 of the other half of the assembly into the central opening of coil 53. Heretofore, it was necessary to assemble the elements of the magnetic flux circuit around the armature coil in double-ended electrodynamic shaker apparatus thereby losing the maximum flux density obtainable from the permanent magnet in each magnetic circuit structure in the assembly.

It should be noted in FIG. 1 that the magnetic spacing or separator block 15 protrudes beyond the ends of pole pieces 11 and 13. This is further noted in FIG. 2 where magnetic spacing blocks 15, 27, 35 and 47 extend beyond the ends of the associated pole pieces. This enables the endplates 71 and 77 as illustrated in FIG. 3 to be located in a specific position around the protruding magnetic spacing blocks of the complete assembly of magnetic structures shown in FIG. 2. FIG. 5 shows endplate 71 in its proper location as determined by magnetic spacing blocks 35 and 47. FIG. 6 also illustrates how the magnetic spacing blocks 35 and 47 locate endplate 71 and magnetic spacing blocks 27 and 15 locate endplate 77. Therefore, when the magnetic circuit structures of FIG. 1 and FIG. 2 are assembled with the movable armature coil assembly of FIG. 3 as illustrated in FIG. 6, movable coil 53 is precisely located in its proper position without the necessity of adjustment or further alignment. It should also be noted that other mating configurations of the endplates and the magnetic structure assembly are possible to accomplish the precise alignment of armature coil 53 within the complete magnetic circuit structure assembly.

Turning now to FIG. 7, the thrust frame or bridge is attached to bearings 79, 81, and bearing 61 and 59 which are respectively attached to frame members 83 and 85 respectively. Cross member 87 connects the ends of the frame members and has thrust rod 89 centrally located thereon for attaching the thrust frame to a test structure. Therefore as a force is imparted to the armature coil 53 by conducting a current therethrough in the presence of the uniform magnetic field generated in the air gaps in the magnetic structure assemblies, that force is transmitted through the bearing block and then to the thrust bridge and hence to thrust rod 89. Since the thrust rod is located along the axis of the entire assembly, the force transmitted to a test structure through the thrust rod is free of any twisting or torque forces which may excite unwanted modes of response in the test structure. It should be noted that other structures may be connected to the moving coil assembly such as a shaker table upon which small items may be attached for the purposes of testing the effect of vibration and acceleration forces thereon.

The directions of the uniform magnetic field in the air gaps of the magnetic structure assembly illustrated in FIG. 6 are such that a force is imparted to the turns of the armature coil located in each air gap in the same direction, parallel to the support rod of the armature coil. For example, if the magnetic flux leaves magnet 37 and passes through the air gap to pole piece 33, then the magnetic flux from magnet 17 should have the same direction and leave magnet 17 through the air gap and enter pole piece 13. Similarly, the magnetic flux should leave magnet 49 through the air gap and enter pole piece 45 and the magnetic flux from magnet 29 should leave magnet 29 through the air gap and enter pole piece 25. Another way of describing the flux direction is that the magnets should be arranged such that all north poles of the magnets are adjacent the air gap and the south poles thereof adjacent the attached pole piece, or, alternately, all the south poles of the magnets be adjacent the air gap and the north poles adjacent the attached pole pieces. Either one direction or the other may be chosen for the polarity of the magnetic flux, but the choice must be consistent throughout the structure.

FIG. 4 illustrates the relative directions of magnet flux, current and the resulting force on a portion of a wire comprising the conductive turns of the armature coil. If the conductor conducts a current I in the direction from left to right in the pictorial view illustrated, and a magnetic flux B is in the vertical direction, then a force F is generated on the conductor to the left which is both perpendicular to the direction of magnetic flux and the flow of current through the conductor. Therefore, it is readily seen that the force generated on moving coil 53 is always parallel to the support rods upon which coil 53 moves.

As illustrated in FIG. 6, pole pieces 33, 45, 13, 25, 11, 23, 43 and 31 are located within the magnetic circuit of armature coil 53. This core of magnetic material within the armature coil magnetic circuit increases the inductance of the coil. Therefore, when armature coil 53 is attached to or excited by a source of alternating current, there is an inductive load presented to the source of alternating current. This causes the impedance to change with frequency and departs from the desired constant resistive load required for optimum electrical performance and the constant current independent of frequency required for a constant force. Heretofore it has been the practice to utilize compensating windings around the pole pieces to generate a counteracting magnetic field to reduce the inductance of the armature coil. The compensating winding results in increased power losses and heating of the magnetic structure and, therefore, is undesirable. The tapered pole pieces reduce the amount of magnetic material within the coil magnetic circuit and also provide within the pole pieces a uniform magnetic flux density near the saturation level for reducing the magnetic permeability of the material, thereby minimizing the inductance of the armature coil.

The purpose of the elastic band suspension system, of which a part is shown in FIG. 8, is to position the armature coil 53 in any desired reference position even when the axis of the entire assembly is mounted in a vertical position. The folding of the bands around the wheels provides a long elastic band with less stretching per unit length and therefore greater motion can be obtained within the elastic limits of the band material. By moving block 97, to the right in FIG. 8, band 91 is further stretched, keeping the coil in the same position, and band 107 is less stretched. Therefore, if the assembly were tilted such that the left side of FIG. 8 where lifted above the horizontal to be at a higher point than the right side, the stretched band 91 would support the weight of the coil assembly and maintain the position of the coil at a reference point. Even when operated horizontally, the coil can be caused to return to any reference position within the magnetic circuit structure assembly.

It now should be apparent that the present invention provides a magnetic circuit structure assembly which may be employed in conjunction with electrodynamic shakers and electromagnetic force generators for providing a precise force on a movable coil located within the magnetic circuit structure assembly and wherein the pole pieces of the magnetic circuit structure are tapered to present a minimum inductance to an alternating source of driving current applied to the moving coil structure.

Although particular components, etc., have been discussed in connection with a specific embodiment of an electrodynamic shaker and electromagnetic force generator constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subjected to various changes, modifications, and substitutions without necessarily departing from the spirit of the invention.

What is claimed is:

1. An electrodynamic force generator comprising:
   movable coil means having a multiplicity of conductive turns and a central opening therethrough, said movable coil means being adapted to connect to a source of electrical current;
   a first magnetic structure having a pair of pole pieces and a magnet, said pair of pole pieces being separated by an elongated opening of uniform width extending from one end to the other end thereof, said pair of pole pieces being connected together at said other end, said magnet being inserted into said opening and attached to one of said pair of pole pieces, the width of said magnet being less than the width of said elongated opening to form a uniform air gap between said magnet and the other of said pole pieces across which air gap a substantially uniform magnetic field is generated, said movable coil means being located to accept within said central opening thereof the other of said pair of pole pieces whereby a portion of said movable coil means moves within said air gap, each of said pair of pole pieces being tapered to be of greater thickness at said other end and of less thickness at said one end to provide a uniform magnetic flux density therein at approximately the saturation level whereby the magnetic permeability of said pair of pole pieces is reduced to a value below the unsaturated permeability to minimize the inductance of said movable coil means; and
   a second magnetic structure substantially identical with said first magnetic structure, the open and unconnected ends of said pair of pole pieces of said first magnetic structure being juxtaposed and mating with the corresponding open and unconnected ends of said second magnetic structure to form a substantially continuous air gap having a substantially uniform magnetic field thereacross, said movable coil means being propelled along said continuous air gap in response to a force generated by said uniform magnetic field upon said electrically conductive turns when an electrical current is conducted therethrough.

2. An electrodynamic force generator comprising:
   a first magnetic circuit structure assembly having a rectangular first pole piece of magnetic material with oppositely disposed parallel flat surfaces separated by a V-shaped slot in one end symmetrically positioned between said parallel flat surfaces, said first magnetic circuit structure having second and third rectangular pole pieces of magnetic material oppositely disposed about said first pole piece, said second and third rectangular pole pieces having flat surfaces thereon parallel spaced from said parallel flat surfaces of said first rectangular pole piece, respectively, one end of said first pole piece opposite the end with said V-shaped slot and one end of each of said second and third pole pieces being magnetically connected together, said second and third pole pieces being tapered in thickness with respect to said flat surfaces thereon, each of said second and third pole pieces having a greater thickness at said one end magnetically connected to said first pole piece, said magnetic circuit structure further having a magnet attached to each of said flat surfaces of said second and third pole pieces whereby an air gap of uniform thickness and uniform magnetic field is formed between said first pole piece and said second pole piece with said magnet attached thereto and an air gap of uniform thickness and uniform magnetic field is formed between said first pole piece and said third pole piece with said magnet attached thereto, the slot in said first pole piece and the taper in said second and third pole pieces being designed to provide a uniform magnetic flux density within the respective pole pieces which is substantially of a magnitude near the saturation level of said magnetic material whereby the magnetic permeability of said respective pole pieces is reduced to a value below the unsaturated value;
   movable coil means having a multiplicity of conductive turns and a central opening therethrough, said movable coil means being adapted to connect to a source of electrical current, said movable coil means being inserted into said first magnetic circuit structure assembly such that said first pole piece is located within said central opening and said movable coil means is movable in the air gaps between said first pole piece and each of said second and third pole pieces;
   a second magnetic structure assembly substantially identical to said first magnetic circuit structure assembly and juxtaposed said first magnetic circuit structure assembly such that the unconnected ends of said first pole piece and said second and third pole pieces of said second magnetic circuit structure assembly mate with the unconnected ends of said first pole piece and said second and third pole pieces of said first magnetic structure, respectively, said movable coil means being movable over said first pole piece of said first magnetic circuit structure assembly and said first pole piece of said second magnetic circuit structure assembly and through the air gaps between each of said first pole pieces and second and third pole pieces of said first and second magnetic circuit structure assemblies, respectively, in response to a force generated by said uniform magnetic field on said conductive turns of said movable coil means when an electrical current is conducted therethrough, the reduced permeability of said pole pieces due to the slotted and tapered construction of said first, second and third pole pieces, respectively, providing a minimum of inductance in said moving coil means whereby a constant current substantially independent of frequency can be generated in said moving coil means to produce a constant force on said conductive turns which is substantially independent of frequency.

3. The electromagnet force generator described in claim 2 wherein said movable coil means includes:
   oppositely disposed end plates attached to the extrememost ends of the juxtaposed first and second magnetic circuit structure assemblies;
   a pair of support rods connected between said end plates along each side of said first and second magnetic circuit structure assemblies adjacent to said first pole pieces of first and second magnetic circuit structure assemblies;
   bearing means attached to each of said support rods, said bearing means freely movable along said support rods; and
   a coil of electrically conductive turns attached to said bearing means whereby said coil can move over each of said first pole pieces of said first and second magnetic circuit structure assembly and within said air gaps.

4. An electrodynamic shaker for applying force to a test structure comprising:
   a first magentic structure having a first rectangular pole piece tapered in thickness from one end to substantially the other end thereof and having a flat surface thereon, a rectangular flat surfaced magnet attached to said flat surface of of said first rectangular pole piece, a second rectangular pole piece tapered in thickness from one end to substantially the other end thereof and having a flat surface thereon located adjacent to and spaced equidistant from said magnet thereby providing an air gap having a uniform magnetic field and a magnetic separator block connected between the other ends of said first and second pole pieces thereby completing the magnetic circuit, the taper of the thickness of said first and second pole pieces being constructed to provide a uniform magnetic flux density within said pole pieces which has a magnitude approximating the saturation level of said pole pieces whereby the magnetic permeability of said pole pieces is reduced;
   a second magnetic circuit structure substantially identical to said first magnetic circuit structure and being attached thereto such that the second pole piece of said second magnetic circuit is juxtaposed said second pole piece of said first magnetic circuit structure;
   a movable armature coil having a multiplicity of electrically conductive turns and having a rectangular central opening therethrough to permit said coil to move freely over the juxtaposed second pole pieces of said first and second magnetic structures and within the air gaps of said first and second magnetic structures, said movable armature coil being adapted to connect a source of electrical current;
   third and fourth magnetic circuit structures substantially identical to said first and second magnetic structures and similarly attached, said third and fourth magnetic circuit structures being aligned and attached to said first and second magnetic circuit structures such that the ends of the pole pieces are juxtaposed and mate with one another whereby the air gaps of said third and fourth magnetic circuits are continuous with said air gaps of said first and second magnetic circuit structures, said movable armature coil moving freely over the juxtaposed and mating second pole pieces and within the continuous air gaps of the assembly of magnetic circuit structures in response to a force generated upon said conductive turns of said armature coil by the uniform magnetic field in said air gaps when an electrical current is conducted through said conductive turns of said armature coil, the reduced permeability of the tapered pole pieces providing a minimum of inductance in said armature coil whereby a constant current substantially independent of frequency can be generated in said armature coil to produce a constant force on said conductive turns which is substantially independent of frequency;
   support means attached to said armature coil for supporting said armature coil in said assembly of magnetic circuit structures, said support means allowing said armature coil to move freely within said air gaps of said assembly; and
   means attached to each side of said armature coil for transmitting the force generated upon said armature coil to a test structure.

5. The electrodynamic shaker described in claim 4 wherein said magnetic separator block in each of said magnetic circuit structures extends beyond the ends of said first and second rectangular pole pieces and wherein said support means comprises:
   a pair of end plates having a pair of mounting holes and an opening therein to mate with and accept the extended portion of the magnetic separator blocks at each end of said assembly of magnetic structures, whereby said pair of mounting holes are precisely positioned with respect to said assembly;
   a pair of rods connected between said end plates and held in said mounting holes such that said rods are accurately positioned adjacent each side of said armature coil as the coil is moved in said air gaps of said assembly; and
   bearing means attached to said armature coil and movably attached to each of said pair of rods whereby said armature coil is accurately positioned in said assembly to move freely in said air gaps and along said pair of rods.

6. The electrodynamic shaker described in claim 5 further including an armature coil suspension comprising:
   a pair of slotted bars extending the length of said assembly;
   a pair of blocks having a set of pins thereon, each of said blocks being adjustably located along one of said slotted bars by a bolt extending through the slot and threaded into said block;

a set of four wheels, one of which is centrally located on each side of each one of said endplates and is free to rotate thereon; and a set of four elastic bands, one of each being attached to said armature coil, two being attached to one side, and two being attached to the other side thereof, each band being stretched around one wheel of said set of four wheels and connected to one of said set of pins on one of said pair of blocks, respectively, such that one block has two bands attached thereto and is movably adjustable along one of said pair of slotted bars to increase the tension on one band and decrease the tension on the other thereby positioning said armature coil within said assembly.

* * * * *